US008103448B2

(12) United States Patent
Nomura

(10) Patent No.: US 8,103,448 B2
(45) Date of Patent: Jan. 24, 2012

(54) INFORMATION STORAGE APPARATUS FOR STORING NEW ROAD, PROGRAM FOR THE SAME, AND SYSTEM FOR THE SAME

(75) Inventor: Toshio Nomura, Obu (JP)

(73) Assignee: DENSO CORPORATION, Kariya (JP)

( * ) Notice: Subject to any disclaimer, the term of this patent is extended or adjusted under 35 U.S.C. 154(b) by 1120 days.

(21) Appl. No.: 11/907,846

(22) Filed: Oct. 18, 2007

(65) Prior Publication Data

US 2008/0103692 A1 May 1, 2008

(30) Foreign Application Priority Data

Oct. 25, 2006 (JP) ................................ 2006-289673
Oct. 25, 2006 (JP) ................................ 2006-289674

(51) Int. Cl.
*G01C 21/30* (2006.01)
(52) U.S. Cl. ........ 701/210; 701/207; 701/208; 701/209; 340/995.11; 340/995.12; 340/995.14; 340/995.18
(58) Field of Classification Search .................. 701/207, 701/208, 209, 210, 211; 340/995.11, 995.12, 340/995.14, 995.18
See application file for complete search history.

(56) References Cited

U.S. PATENT DOCUMENTS

| 6,125,323 A | 9/2000 | Nimura et al. |
| 6,154,152 A * | 11/2000 | Ito .................................. 340/988 |
| 6,278,941 B1 * | 8/2001 | Yokoyama ..................... 701/209 |
| 6,453,233 B1 * | 9/2002 | Kato .............................. 701/208 |
| 6,853,913 B2 * | 2/2005 | Cherveny et al. ............. 701/208 |
| 7,035,733 B1 * | 4/2006 | Alwar et al. .................. 701/210 |
| 7,079,946 B2 * | 7/2006 | Hunzinger ..................... 701/208 |
| 7,099,882 B2 * | 8/2006 | McDonough ........................ 1/1 |
| 7,490,006 B2 * | 2/2009 | Sekine et al. .................. 701/208 |
| 7,711,473 B2 * | 5/2010 | Sekine et al. .................. 701/200 |
| 2004/0002812 A1 * | 1/2004 | Yamanaka ..................... 701/208 |
| 2004/0133344 A1 * | 7/2004 | Hashida et al. ............... 701/208 |

FOREIGN PATENT DOCUMENTS

| JP | A-10-332391 | 12/1998 |
| JP | A-2003-42774 | 2/2003 |
| JP | A-2004-101982 | 4/2004 |
| JP | A-2006-220449 | 8/2006 |

* cited by examiner

*Primary Examiner* — Thomas Black
*Assistant Examiner* — Peter D Nolan
(74) *Attorney, Agent, or Firm* — Posz Law Group, PLC

(57) ABSTRACT

A vehicle navigation system detects a new road that is not recorded in a map for updating map data during a travel. After exiting from the new road, the increase of the data size of road map data at a time of addition of the new road to the map is estimated, and a collection of the data is transmitted to a server together with positional information and a travel frequency of the new road as a bundle of records of the new roads for facilitating a determination whether a combination of new roads from an updated road map database fits in a storage medium for the sake of user distribution.

7 Claims, 4 Drawing Sheets

FIG. 4
| NO | PT (COORD. OR MAP CODE) | INCREASE SIZE (BYTE) | FREQUENCY (NO. OF TIMES) |
|---|---|---|---|
| 1 | (136° 54' 07", 35° 10' 56"), (136° 54' 07", 35° 10' 60"), (136° 55' 00", 35° 10' 02"), (136° 54' 07", 35° 12' 00") | 1000 | 3 |
| 2 | (735002*55), (735002*70) | 50 | 1 |
| 3 | (136° 54' 07", 35° 10' 56"), (735002*55), (136° 54' 07", 35° 12' 00"), | 300 | 10 |
FIG. 5
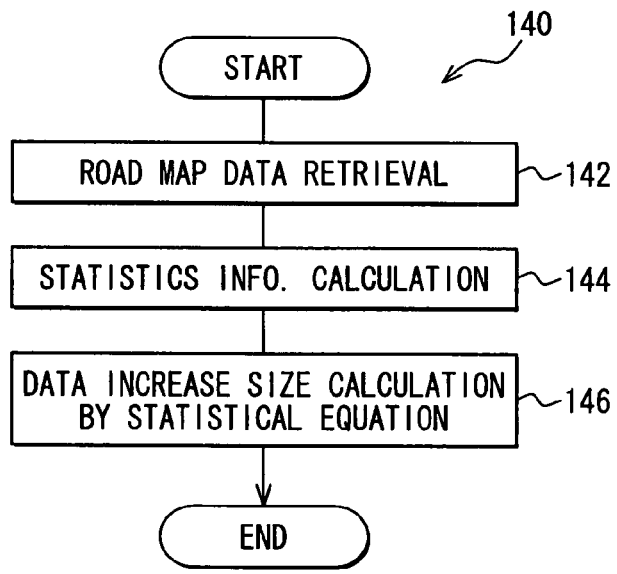
FIG. 6
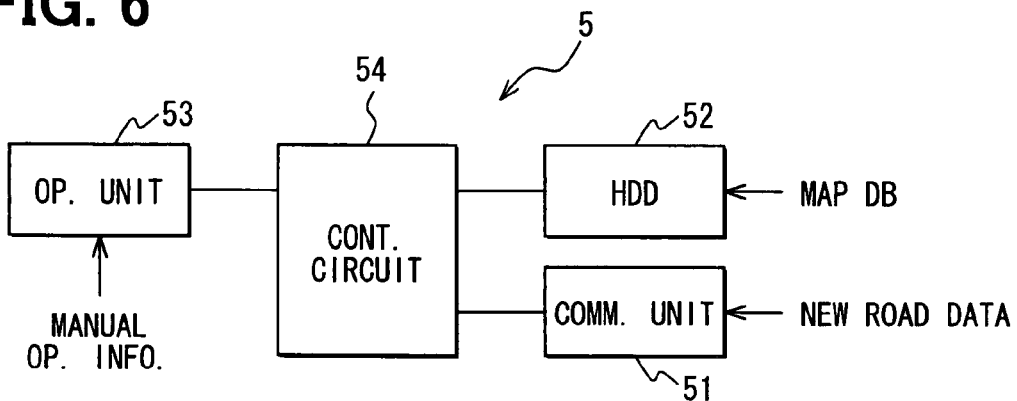

INFORMATION STORAGE APPARATUS FOR STORING NEW ROAD, PROGRAM FOR THE SAME, AND SYSTEM FOR THE SAME

CROSS REFERENCE TO RELATED APPLICATION

This application is based on and claims the benefit of priority of Japanese Patent Application No. 2006-289673 filed on Oct. 25, 2006 and No. 2006-289674 filed on Oct. 25, 2006, the disclosure of which is incorporated herein by reference.

FIELD OF THE DISCLOSURE

The present disclosure generally relates to a new road information storage apparatus for use in a vehicle, as well as a program and a system for storing new road information.

BACKGROUND INFORMATION

In recent years, an addition of a new road to road map data is performed by using a vehicle that is equipped with an apparatus for recording new road information instead of using a worker that conduct on-site inspection with reference to a paper map (refer to Japanese Patent Document JP-A-H10-332391). In the technique used in the addition of the new road, the new road information recording apparatus generates information on the new road based on road information input by an occupant of the vehicle, an image around the vehicle captured by a camera or the like.

The road information generated by the above described manner is, for example, handed to a trader that generates and sells road map data (designated as the first tier trader hereinafter), and the first tier trader updates the road map data with the new road information for map data renewal. Then, the road map data updated in the above described manner is further handed to the second tier trader such as a navigation apparatus producer or the like that records the updated road map data in a storage medium such as a hard disk drive (HDD), a digital versatile disk (DVD), a CD-ROM or the like that is intended for a sale to users.

The second tier trader must have the road map data that has a data size to be storable in the storage medium such as the HDD, DVD, CD-ROM or the like due to distribution requirement to the users. Therefore, the second tier trader is required to determine which portion of the updated road map data provided by the first tier trader should be stored in the storage medium for the distribution to the users.

However, the second tier trader is having a hard time for finding out how much of the data size contributes to which of the new roads in the road map data provided by the first tier trader. Therefore, the second tier trader is required to sort out which combination of the new roads fits in the storage medium by trial and error.

SUMMARY OF THE DISCLOSURE

In view of the above and other problems, the present disclosure provides an apparatus, a program and a system that facilitates a storage medium capacity matching that determines which portion of an updated road map data, or which combination of plural new roads, is appropriately stored in a storage medium for data distribution to users.

The first aspect of the present disclosure is regarding a new road information storage apparatus for use in a vehicle that has a data retrieval unit for retrieving positional information of each of plural roads (i.e., the first road map data), and a position detector for detecting a current position of the vehicle. The apparatus is characterized by the following features, that is, it is capable of determining that the current vehicle position does not belong to any of the plural roads in the first road map data based on the positional information of the plural roads, and it is also capable of estimating an increase of data size of the second road map data when a new road defined as a set of positions that are determined not to be belonging to any of the plural roads in the first road map data is added to the second road map data for the storage of the estimated increase of the data size regarding the new road together with the positional information of the new road.

When a vehicle equipped with the above-described new road information storage apparatus travels a new road that is not stored in the first road map data, the apparatus estimates the increase of the data size of the second road map data after an addition of the new road to the second road map data, and the estimated increase of the data size is stored in the storage medium together with the positional information of the new road. In this manner, the estimated increase of the road map data is collected and utilized for the determination that which combination of the new roads can appropriately be stored in a vacancy of the storage medium for user distribution and which combination cannot be stored in the medium.

In addition, the first road map data and the second road map data may be identical, or may be different. Further, the second road map data may be real road data that really exists, or may be virtual road map data.

Furthermore, the new road information storage apparatus may be realized as a program that operates a computer to be serving as an equivalent of the storage apparatus, or as a system that includes the storage apparatus and a communication device for road map data exchange.

BRIEF DESCRIPTION OF THE DRAWINGS

Other objects, features and advantages of the present invention will become more apparent from the following detailed description made with reference to the accompanying drawings, in which:

FIG. 4 shows an illustration of data content transmitted from the navigation apparatus to a server;

FIG. 5 shows a flowchart of a step in the program executed in the control circuit of the navigation apparatus;

FIG. 6 shows a block diagram of the server; and

DETAILED DESCRIPTION

Figure 1:
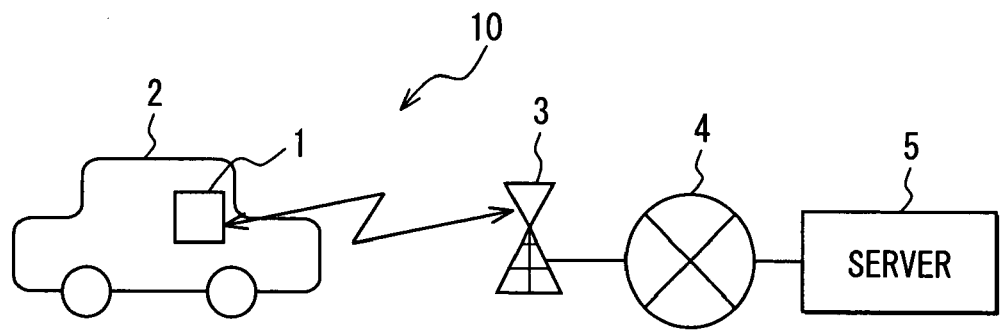
FIG. 1 shows a block diagram of a new road information storage system in an embodiment of the present disclosure.

An embodiment of the present invention is explained as follows. FIG. 1 shows a new road information record system 10 in the present embodiment. In FIG. 1, a navigation apparatus 1 on a vehicle is disposed on a vehicle 2. The navigation apparatus 1 can communicate with a base station 3 on the ground by wireless connection, and can also communicate with, through a telecommunication network 4 which this wireless connection and the base station 3 belongs to, a server 5 on the telecommunication network 4. The new road information record system 10 includes the navigation apparatus 1 and the server 5.

The communication between the navigation apparatus 1 and the server 5 conveys positional information of the new road which the vehicle 2 has traveled, information of a size increase of road map data by an addition of the new road, and, information of transit frequency of the new road from the navigation apparatus 1 to the server 5. The content of the information are explained in detail in the following.

Figure 2:
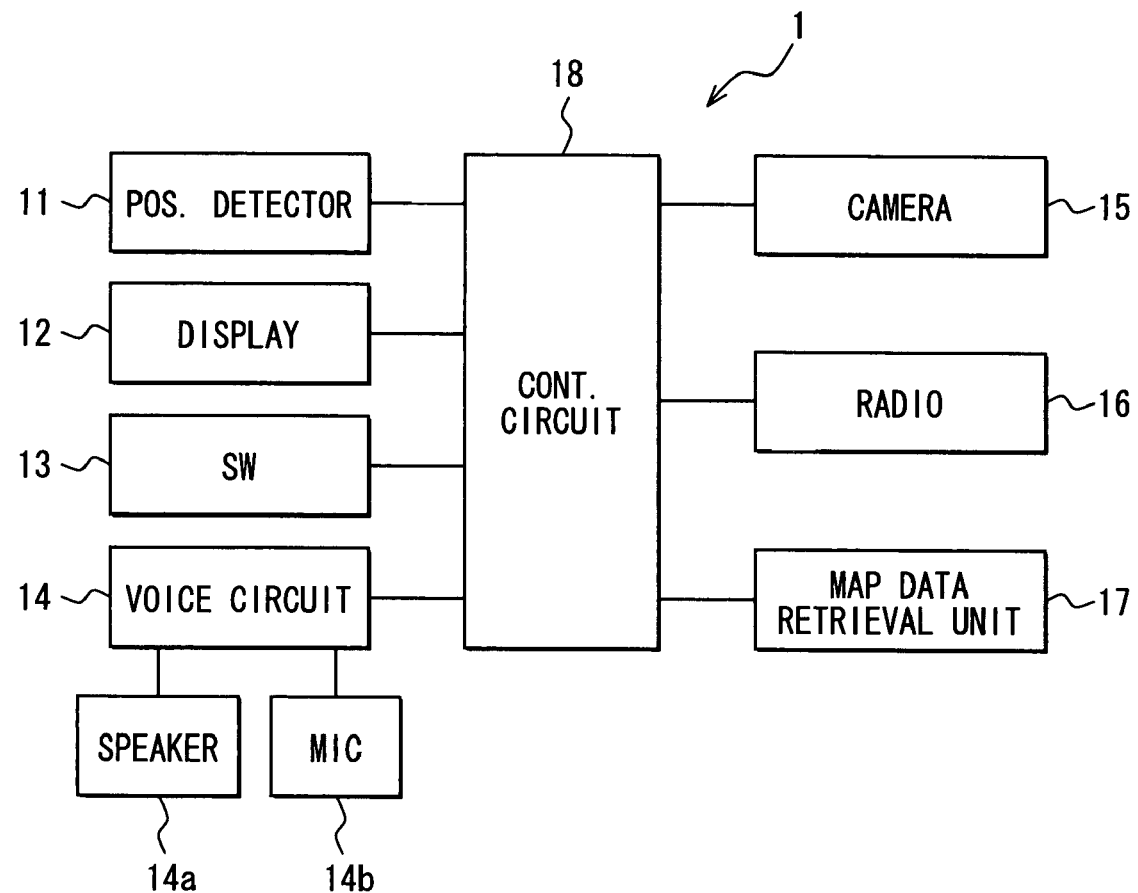
FIG. 2 shows a block diagram of a navigation apparatus in the embodiment of the present disclosure.

First, an explanation about the positional information of the new road in the navigation apparatus 1, and an explanation about formation of the information of size increase of the road map data by the new road are provided. FIG. 2 shows a hardware configuration of the navigation apparatus 1 for use in the vehicle. The navigation apparatus 1 has a position detector 11, an image display unit 12, operation switches 13, an audio circuit 14, a speaker 14a, a microphone 14b, a camera 15, a radio circuit 16, a road map data retrieval unit 17, and a control circuit 18.

The position detector 11 has sensors such as a magnetic field sensor, a gyroscope, a speed sensor, and a global positioning system (GPS) receiver which are common in the art (not illustrated), and information to determine a current position and direction based on a property of these sensors is output from the detector 11 to the control circuit 18. The image display unit 12 displays an image based on a video signal output from the control circuit 18 for a user.

The operation switches 13 consist from an input unit such as a touch panel on a display surface of the image display unit 12 and/or plural mechanical switches disposed on the navigation apparatus 1. The operation switches 13 output signals to the control circuit 18 based on pushing down of the mechanical switches and a touch on the touch panel by the user.

The audio circuit 14 outputs speech signal based on audio data received from the control circuit 18 to the speaker 14a, and the audio data based on the speech signal which the microphone 14b has detected is output to the control circuit 18.

The camera 15 captures an image around the vehicle 2 one by one, and the captured images are output to the control circuit 18. The camera 15 may be a camera photographing only a specific direction (e.g., a front direction of the vehicle 2) relative to the vehicle 2, may be a camera for 360 degree imaging, or may be plural cameras photographing plural directions relative to the vehicle 2 respectively.

The radio circuit 16 applies processes such as amplification, frequency transformation, demodulation, AD conversion for the signal which an antenna (not illustrated) has received, and outputs the processed data to the control circuit 18. Further, the radio circuit 16 applies processes such as D-A conversion, modulation, frequency transformation, amplification for data received from the control circuit 18, and the processed signal is output to the antenna. By such operation, the radio circuit 16 is, under control of the control circuit 18, capable of communication with the server 5 through the base station 3 by wirelessly connecting thereto.

The road map data retrieval unit 17 consists of equipments which performs read/write (when possible) operation of data for a nonvolatile storage medium such as a DVD, a CD, a HDD, and the like and the medium itself. The retrieval unit 17 stores a program to be executed by the control circuit 18, road map data and the like.

The road map data is the data for use in displaying a road map on the image display unit 12, for use in calculating optimal path between two spots, for use in performing a well-known map matching, and the like. In the road map data of the above storage medium, information such as a relationship between a geographical location and a road, a relation of connection between roads, a relationship between a geographical location and a facility, and, a relationship between a geographical location and a background image is stored by using a specific data structure (KIWI format, for example, which is well-known in the art) for these uses.

The control circuit (i.e., a computer) 18 is a microcomputer having a RAM, a ROM, a flash memory, an I/O and the like. The central processing unit (CPU) of the microcomputer executes a program for operation of the navigation apparatus 1 by retrieving the program from the ROM and the road map data retrieval unit 17, and execution of the program is accompanied by information retrieval from the RAM, the ROM, and the road map data retrieval unit 17, as well as information writing on the RAM and (when possible) the road map data retrieval unit 17. The control circuit 18 performs signal exchange with the position detector 11, the image display unit 12, the operation switches 13, the audio circuit 14, the camera 15, and the radio circuit 16 during the above operation.

The control circuit 18 carries out processes such as, a current position identification process, a navigation route calculation process, a route guidance process, a new road information recording/transmission process by executing the program.

The current position identification process is a process for identifying the current position of the vehicle 2, the traveling direction of the vehicle 2, a road which the vehicle 2 belongs to by the use of technology such as map matching and the like based on a signal from the position detector 11. The method for identifying the road which the vehicle 2 belongs to by map matching is well-known. However, there are some cases which the road which the vehicle 2 belongs to cannot be identified. For example, when the current position that is indicated by a signal received from the GPS receiver of the position detector 11 is distant from any of the roads in the road map data by a predetermined distance or more, that is the case where the road which the vehicle 2 belongs to cannot be identified.

The navigation route calculation process is a process calculating an optimal navigation path from the current position to the destination by having an input from the user through operation switches 13. The route guidance process retrieves the road map data from the road map data retrieval unit 17, outputs the image which shows the calculated navigation path, the destination, stop-by places, the current position and the like on the map which is derived from the road map data to the image display unit 12, outputs a guidance speech signal indicating a right/left turn as required at a time of approach of the subject vehicle to an intersection or the like to the audio circuit 14, and displays a map of the subject intersection (i.e., a magnified map hereinafter) on the image display unit 12 in a greater magnification scale relative to the scale of a detailed map.

The new road information recording/transmission process is a process, when a current position belongs to neither of plural roads of the road map data, for storing information of a new road defined as a set of positions that are determined not to belong to any of the plural roads in the retrieval unit 17 or the flash memory of the control circuit 18 and for transmitting the stored information to the server 5. The information about a new road is positional information of the new road, information of size increase of the road map data by an addition of the new road, information of transit frequency of the new road, and the like.

Figure 3:
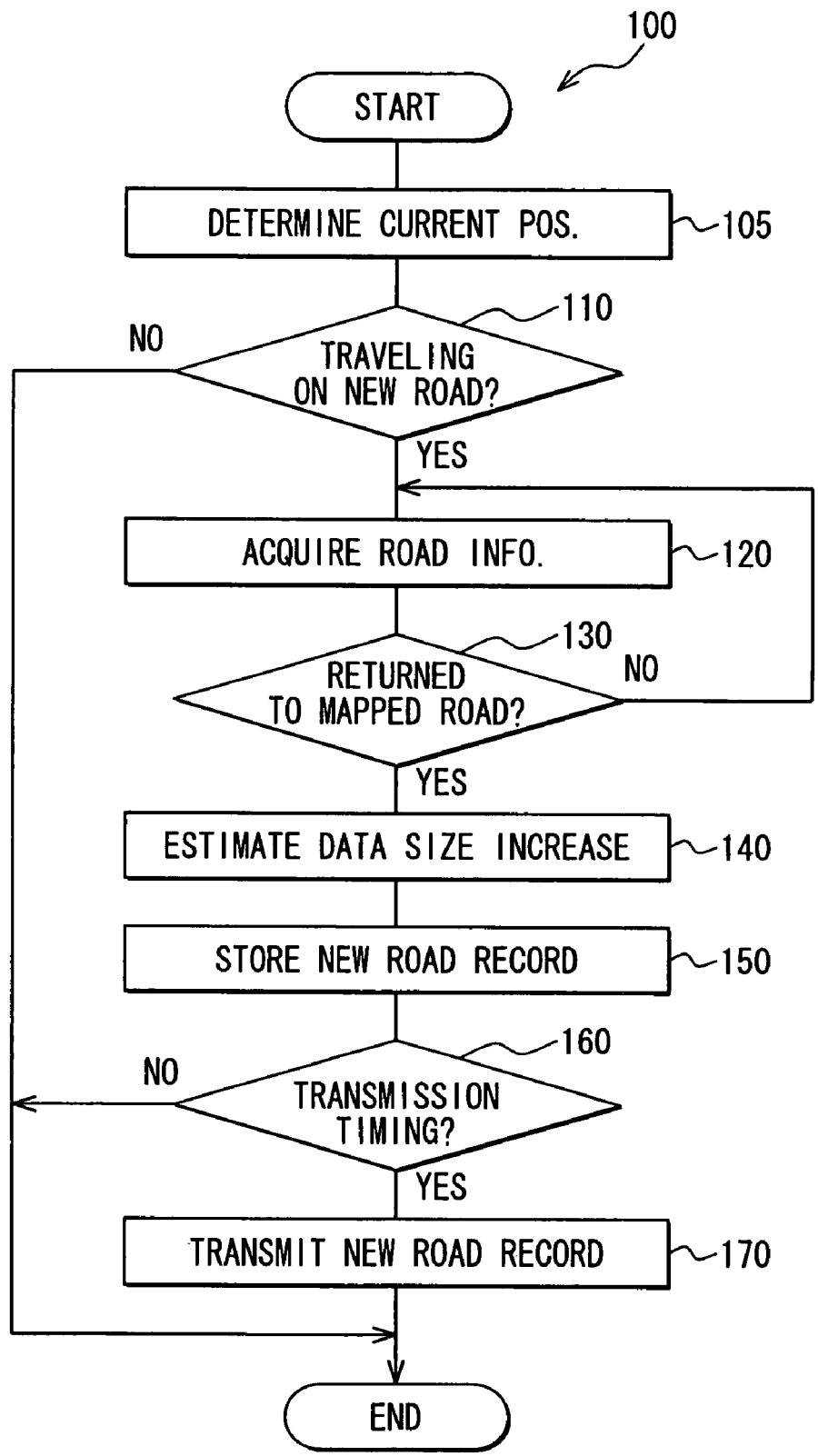
FIG. 3 shows a flowchart of a program executed in a control circuit of the navigation apparatus.

FIG. 3 shows a flowchart of the program executed by the CPU for the new road information recording/transmission process.

First, in the process that is performed by the CPU which carries out this program, the control circuit 18 identifies the current position by the current position identification process in step 105. Then, in step 110, the process determines whether the vehicle 2 travels the road which is not on the map, that is, a new road, based on the identification result in step 105. If the vehicle is determined to be traveling on a certain road on the map, current execution process of the program 100 concludes itself.

When the vehicle 2 is determined to be traveling on the road not shown on the map, road information is acquired in step 120 successively. For an acquisition of the road information, the current position of the vehicle 2 is pinpointed in a practical manner by the current position identification process as stated above, and the acquisition of the road information realizes the identification of the road position of the new road that is not yet mapped on the map. In addition, the acquisition of the road information may be performed as a process such as an image recognition for a photographed image received from the camera 15 or the like to detect an intersection, land types (a mountain, a river, a green tract of land, sands), various signboards (a directions signboard, a regulation information signboard, a facility signboard). Further, the acquisition of the road information may be realized as a process accepting manual input of the road information by the user from the operation switches 13. Furthermore, the acquisition of the road information may be realized as a voice recognition process that recognizes a voice sound expressing the road information from the user through the microphone 14b and the audio circuit 14.

Then, in step 130, whether the vehicle 2 has returned to a road in the map is determined by checking a map matching for the road in the road map data as a result of the current position identification process in step 120. When it is determined that the vehicle 2 has returned, the process proceeds to step 140 successively, and when it is determined that the vehicle 2 has not returned, that is, the vehicle 2 is still on the new road, the process repeats execution of step 120.

In this way, while the vehicle 2 is traveling on the new road into it until the exit therefrom, the control circuit 18 iterates an acquisition of the road information by the above method (e.g., for every second, for every 10 meter travel) described as the process from step 110 to 130.

In step 140, an increase of data size of the road map data by a process for adding information of the new road in the road map data (the data may be the road map data in the road map data retrieval unit 17, or may be virtual road map data different from the equipped one) is calculated based on the road information of an acquired new road. The contents of this calculation process is described later. The road map data in the road map data retrieval unit 17 is designated as an equipped road map data hereinafter.

Then, in step 150, the data size increase in step 140, the positional information of the positions that constitutes the new road as a result of iteration of step 120 (e.g., the latitude and longitude, and a map code), and transit frequency of the new road by the vehicle 2 are stored in combination as a new road record in the flash memory or the storage medium of the map data retrieval unit 17.

In this case, the transit frequency may be the number of travels of the vehicle 2 through the new road in a period defined as a predetermined number of days backward from the current date (e.g., a month), or may be the amount of other parametric value. For determining the frequency, the control circuit 18 retrieves the new road record which is already recorded in step 150, and determines whether the new road record about the new road currently being recorded or a similar road (that meets a predetermined standard of similarity), and the frequency of the new road record is modified if it is found (for example, the transit frequency number is increased by one).

In step 160, the present time is determined whether it is a time of predetermined interval for transmission (e.g., at an interval of one month). When it is determined as the transmission timing, the process proceed to step 170. When it is not the transmission timing, the process concludes itself.

In step 170, all of the recorded new road records are transmitted to the server 5 by controlling the radio circuit 16. All of the plural new road records in storage may be erased at this time. An example of plural new road records is shown in FIG. 4 in a tabular format. In the list, each row except for a top one represents one new road record respectively. After step 170, an execution of the program 100 for a current cycle finishes.

The calculation of size increase in step 140 is explained. A flowchart about the details of process in step 140 is shown in FIG. 5. First, as shown in the flowchart, the control circuit 18 controls the road map data retrieval unit 17 in step 140 for retrieving the equipped road map data (step 142), and statistical information is calculated from the equipped road map data (step 144). Then, a computation equation that accords with the calculated statistical information is used to calculate the size increase (step 146).

The statistical information of the map data to be calculated is a representative value of an increase of the data size of the equipped road map data when a specific element of the equipped road map data is increased by a unit quantity without changing other element (e.g., an average, a mode or the like). In this case, the specific element in the equipped road map data may be, for example, a link count, an intersection count, road length, a keyword count, a mark image count, the number of interchanges, service areas, parking areas in an expressway, or the like. In addition, this statistics may be statistics about all data of the equipped road map data. Further, this statistics may be statistics about all data in a specific geography domain of the road map data. The specific geography domain may be a specific geographical region including a current position of the vehicle 2 (one parcel in KIWI format for example). When such a geographical region is adopted, the calculation of the size increase can reflect a dispersion of regional relationships between the amount of the elements and the size of the road map data.

A calculation method of concrete statistics is shown by having the road map data in KIWI like format as an example.

For example, a total of following values A, B, and C is considered as size increase per one link when a specific element is the link count.

A=[a division value calculated by dividing a total data size of road data frames in one compartment (or whole compartments) of the equipped road map data by the total number of links in the compartment (or in whole compartments)]

B=[a division value calculated by dividing a total data size of route calculation data frames in a detailed map of one compartment (or whole compartments) of the equipped road map data by the total number of links in the compartment (or in whole compartments)]

C=[a division value calculated by dividing a total data size of infrastructure representation data in a detailed map of one compartment (or whole compartments) of the equipped road map data by the total number of links in the compartment (or in whole compartments)]

The value A is chosen as an index due to its characteristic that the number of data elements in the road data frames for representing parameters such as a road structure or the like is directly proportional to the number of links (i.e., the link count). Further, the value B is chosen as an index due to its characteristic that the data size of the route calculation data frames for describing connection structures between plural roads for use in route calculation is substantially directly proportional to the number of links (i.e., the link count). Furthermore, the value C is chosen as an index due to its characteristic that the number of items in the infrastructure representation data for storing notice information in VICS (Vehicle Information and Communication Service in Japan) is substantially directly proportional to the number of links (i.e., the link count).

As yet another example, when the specific element is a link count, the following values D, E, and F in total are considered as a size increase of an intersection.

D=[a division value calculated by dividing a total data size of the magnified map (a portion of the route navigation data frame) in one compartment (or whole compartments) of the equipped road map data by the total number of intersections in the compartment (or in whole compartments)]

E=[a division value calculated by dividing a total data size of intersection name search data (a portion of hierarchical search data) in one compartment (or whole compartments) of the equipped road map data by the total number of intersections in the compartment (or in whole compartments)]

F=[a division value calculated by dividing a total data size of intersection name voice recognition data (a portion of voice recognition data) in one compartment (or whole compartments) of the equipped road map data by the total number of intersections in the compartment (or in whole compartments)]

These values D, E, and F are chosen as indices because data for the magnified map, for intersection name search, and for intersection name voice recognition respectively increase in a substantially directly proportional manner to the number of intersections.

Also, when the specific element is road length, the following value G is considered as size increase of a unit length of a road.

G=[a division value calculated by dividing a total data size of background data frames in one compartment (or whole compartments) of the equipped road map data by the total length of roads in the compartment (or in whole compartments)]

The value G is chosen as an index because the data elements in the background data frames increases in a directly proportional manner to the number of form points, and because the number of form points is substantially proportional to the total length of the roads.

Also, when the specific element is the number of keywords, the following value H is considered as size increase of one keyword.

H=[a division value calculated by dividing a total data size of name data frames in one compartment (or whole compartments) of the equipped road map data by the total number of keywords in the compartment (or in whole compartments)]

The value H is chosen as an index because the number of name data frames is substantially proportional to the total number of keywords.

Also, when a specific element is a mark image, the following value 1, J, and K are considered as size increase of one mark.

I=[a division value calculated by dividing a total data size of signboard data and mark data in one compartment (or whole compartments) of the equipped road map data by the total number of marks in the compartment (or in whole compartments)]

J=[a division value calculated by dividing a total data size of magnified map data, branch map data, and illustration data in one compartment (or whole compartments) of the equipped road map data by the total number of marks in the compartment (or in whole compartments)]

K=[a division value calculated by dividing a total data size of sound data frames in one compartment (or whole compartments) of the equipped road map data by the total number of marks in the compartment (or in whole compartments)]

Also, when a specific element is the number of interchanges (ICs), service areas (SAs), and parking areas (PAs) in an expressway, the following value L, M are considered as size increase of one IC, one SA, or one PA.

L=[a division value calculated by dividing a total data size of expressway map data in all expressways in one compartment (or whole compartments) of the equipped road map data by the total number of facilities in all expressways in the compartment (or in whole compartments)]

M=[a division value calculated by dividing a total data size of two sets of expressway map data in all expressways in one compartment (or whole compartments) of the equipped road map data by the total number of facilities in all expressways in the compartment (or in whole compartments)]

In this manner, when the specific element of the equipped road map data is increased by one unit with the amount of other elements unchanged, representative value of data size increase of the equipped road map data, that is, the statistical information, is determined.

Further, data increase size calculation by the computation equation that accords with the statistical information in step 146 is performed in the following manner. That is, based on the road information of the new road acquired by repeating step 120, the number of links, intersections, road length, keywords, mark images, ICs, SAs, PAs in the new road as described above are identified, and each of the identified values are multiplied respectively by size increase of the intersection, of the unit length of a road, of the keyword, of the mark, of the IC/SA/PA. The multiplied values are then summed up to have an estimation value of the size increase.

In this case, the number of intersections in the new road may be detected by an image recognition process performed on an image from the camera 15, or may be counted based on a notice from the occupant of the vehicle 2 by voice or by an operation of the operation switches 13. In addition, the number of links in the new road is calculated as the value that results from subtracting one from the number of intersections in the new road.

Further, the road length in the new road is identified as a total length of sections in the new road, and each of the sections is identified as a link for combining constituent points of the new road.

The number of the keywords of the new road may be picked up and counted from the image captured with the camera 15 by using an image recognition process for recognizing signboards showing an intersection and/or regulation information in the image. The keywords may also be counted by recognizing a voice or an operation of the operation switches 13 by the occupant of the vehicle 2 for indicating that a certain word may be highly possibly categorized as the keyword.

The number of the mark images of the new road may be counted by recognizing intersections, signals, regulation information signboards, direction signboards, facilities in the image captured by the camera 15 by the use of an image recognition process, or may be counted by recognizing a voice or an operation of the operation switches 13 by the occupant of the vehicle 2 for indicating that a certain image may be highly possibly categorized as the mark images.

In addition, size increase of equipped road map data by an addition of the new road to the equipped road map data is calculated by the process in steps 142-146 instead of adding the new road to other road map data. However, size increase of virtual road map data (or existing certain other road map data) by an addition of the new road to the road map data may be calculated. In this case, each of the indices used as stated above may be set beforehand, and may be stored in the ROM or in the storage medium of the road map data retrieval unit 17.

As described above, while the control circuit 18 determines that the detected current position (refer to step 105) is determined to be in the new road that does not exists in the map (refer to step 110, 130) for each of the new roads, the control circuit 18 repeats the acquisition of the road information of the new roads (refer to 120), and when the vehicle 2 is determined to have left the new road, the control circuit 18 calculates the size increase of the road map data by an addition of the new road (refer to step 140), and stores positional information and transit frequency of the new road together with the calculated size increase for each of the new roads (step 150), and transmits plural new road records of the plural new roads at a predetermined timing (step 160) to the server 5 (refer to step 170).

When the vehicle 2 having the navigation apparatus 1 travels the new road which is not recorded by the equipped road map data (the first one), size increase of the road map data (the second one) by an addition of the new road is estimated by the navigation apparatus 1, and the estimation of the increase is recorded in the storage medium with positional information of the new road. In this way, by collecting and using the information on the estimation of the size increase, the map data distributor or the like may easily determine what combination of the new roads fits in a vacant space of the storage medium for user distribution, or what combination does not. In the present embodiment, the information is actually collected through the transmission of the size increase to the server 5, the collection of the information may be conducted by other method.

Further, the navigation apparatus 1 records and transmits the transit frequency of the vehicle 2 through the new road together with the positional information and the size increase of the new road about. In this manner, whether a certain combination of the new roads may or may not be stored in the storage medium can easily determined. In addition, the importance of the new road for a user can be easily evaluated based on the frequency.

Furthermore, by estimating that the size increase by the new road is greater when the new road is longer, the navigation apparatus 1 can accurately estimate the size increase by the new road, as shown in the example of KIWI format.

In addition, by identifying the relationship between the length of the roads in the equipped map data and the data size for representing the roads, the navigation apparatus 1 can determine the data size increase by an addition of the new road based on the data structure of the equipped road map data in a database.

In addition, by estimating the size increase to be proportional to the number of the intersection in the new road, the navigation apparatus 1 can accurately estimates the size increase, as shown in the example of KIWI format.

In addition, by identifying the relationship between the number of the intersections in the equipped map data and the data size for representing the intersection, the navigation apparatus 1 can determine the data size increase by an addition of the new road based on the data structure of the equipped road map data in a database.

A hardware configuration of the server 5 is described in the following with reference to the block diagram in FIG. 6. The server 5 has a communication unit 51, a hard disk drive 52, an operation unit 53 and a control circuit 54.

The communication unit 51 is connected to the telecommunication network 4, and, through the telecommunication network 4 and the base station 3, the communication unit 51 serves as a network interface of well-known type for a communication with the navigation apparatus 1. When the communication unit 51 receives a new road record from the base station 3, the new road record is output to the control circuit 54.

The hard disk drive 52 is a storage medium storing a program for the operation of the control circuit 54, a new master road map database and the like provided by a first tier trader or the like.

The operation unit 53 accepts an operation of users from a keyboard, a mouse, or the like, and outputs a signal to the control circuit 54 according to the accepted operation content.

The control circuit 54 (equivalent of a computer) is a microcomputer having the RAM, ROM, flash memory, I/O and the like. The control circuit (i.e., a computer) 18 is a microcomputer having a RAM, a ROM, a flash memory, an I/O and the like. The central processing unit (CPU) of the microcomputer executes a program for operation of the server 5 by retrieving the program from the ROM and the hard disk drive 52, and execution of the program is accompanied by information retrieval from the RAM, the ROM, and the hard disk drive 52, as well as information writing on the RAM and the hard disk drive 52 and signal exchange with the operation unit 53 and the control circuit 54. For example, the control circuit 54 stores the received new road record in the hard disk driver 52.

Figure 7:
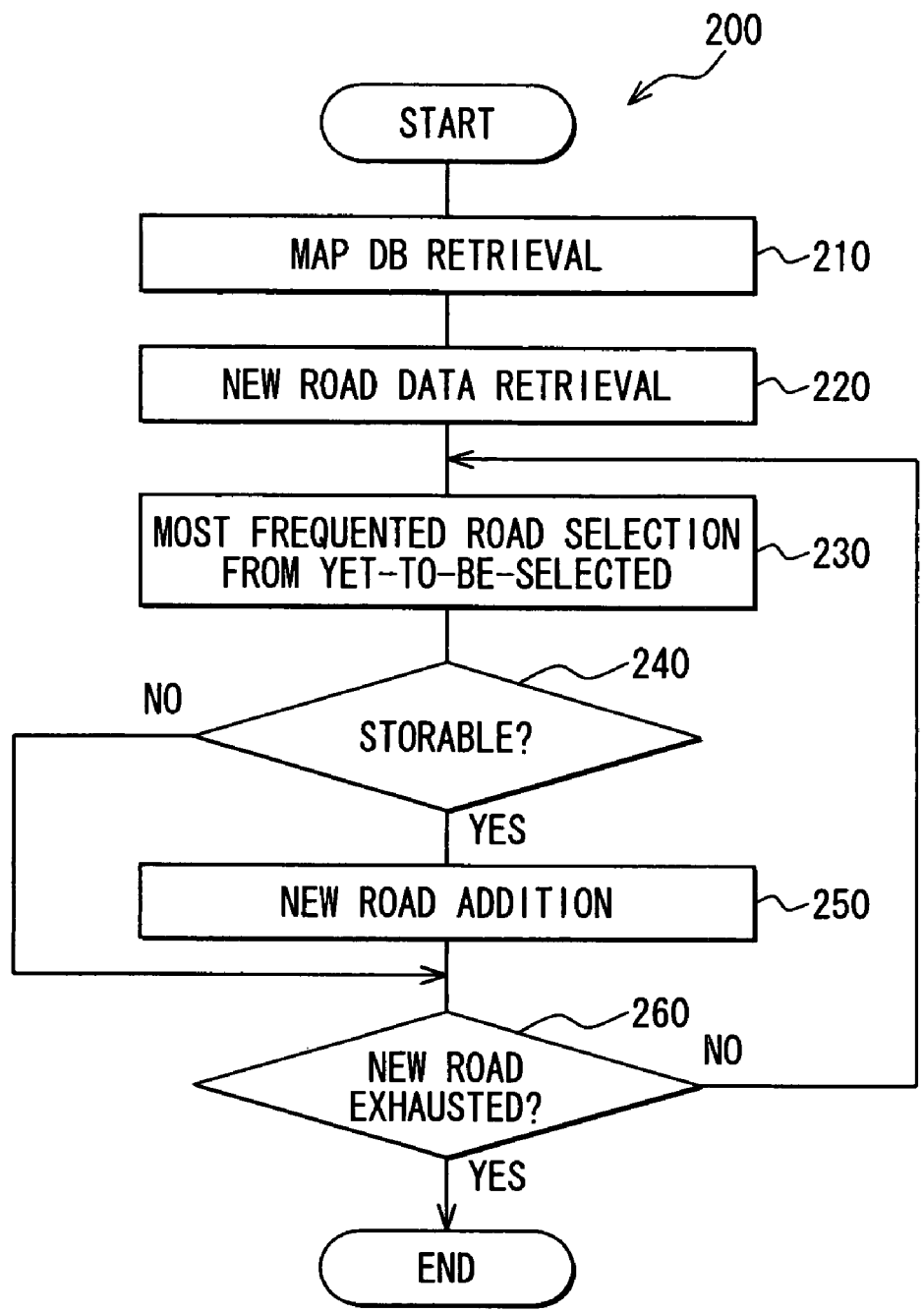
FIG. 7 shows a flowchart of a program executed in a control circuit of the server.

A flowchart of a program 200 that the central processing unit of the control circuit 54 carries out is shown in FIG. 7. The control circuit 54 starts execution of the program 200 based on a predetermined operation on the operation unit 53 by the user, and at first reads out the master road map database in the hard disk drive 52 in step 210. Then, in step 220, the new road data recorded on the hard disk drive 52 is read out entirely by receiving the data through the communication unit 51.

Then, in step 230, a new road record having the highest frequency value is selected from among the new road records not yet selected. Then, in step 240, whether the size increase recorded in the selected new road record can be accommodated by the vacant space of the storage medium for user distribution.

In this case, the storage medium for user distribution is a storage medium such as a hard disk, a DVD-ROM, a CD-ROM or the like, for storing road map data to be provided for a user together with (or sold separately from) the navigation apparatus 1. The vacant space is an amount calculated by subtracting the road map data size from the total capacity of the storage medium. The vacant space information may be recorded on the hard disk drive 52 beforehand, or may be inputted by an operation of an operator for specifying the vacant space amount.

If the size increase recorded in the new road record can be accommodated by the vacant space in the storage medium, the process proceeds to step 250. If the size increase cannot be accommodated by the space in the storage medium, the process proceeds to step 260.

In step 250, the new road represented by a new road record currently being selected is added to the road map data for a storage in the storage medium. Then, the data size of the added record is subtracted from the current vacant space size. In this case, the road map data for the storage in the storage medium for user distribution (designated as user distribution data hereinafter) is stored in the hard disk drive 52. The user distribution data may be actually stored in the storage medium for user distribution on by using other device, or by using the server 5.

More practically, an addition of the new road to the storage medium for user distribution is performed in the following manner. That is, the new road is identified as the road in the master road map database retrieved in step 210 based on the positional information in the new road record, and the information regarding the identified new road in the database is added to the user distribution data. The process in step 250 is succeeded by the process in step 260.

In step 260, whether the new road data currently being selected is the last one among the new road data is determined. The execution of program 200 is ended if the selected data is the last one, or otherwise step 230 is executed again.

By carrying out the program 200, the control circuit 54 performs the addition of the new road to the user distribution data (refer to step 250) in an order of the transit frequency (refer to step 230) by determining that the data can be accommodated by the vacant space (refer to step 240) by utilizing the new roads represented by the new road data received from the navigation apparatus 1.

In this way, the server 5 is, based on the received records of the new road, capable of adding the new road to the road map data so as (A) to be accommodated by the medium for user distribution (B) by prioritizing the highly traveled new roads.

Therefore, in other words, the selection or combination of the new roads to be distributed for the user by the storage medium is automated in view of the accommodation of the data in the limitation of the vacant space of the medium.

Further, the control unit 54 may change the contents of the new road data such as the data size, transit frequency or the like based on the setting by the operator with the operation unit 53.

In other words, the present invention may be grasped as an apparatus for recording new road information in the above disclosure.

Although the present invention has been fully described in connection with the preferred embodiment thereof with reference to the accompanying drawings, it is to be noted that various changes and modifications will become apparent to those skilled in the art.

For example, a function for estimating the size increase may be realized as another control unit separately from the control unit 18. In that case, the information required may be exchanged between the another control unit and the control unit 18.

Further, the size increase of the background data frame may be calculated in proportion to an average of the curvature of the road beside considering the length of the new road, because the interval of the form points may become smaller when the curvature of the new road becomes smaller.

Furthermore, the size increase of the background data frame may be calculated based on a calculation of the relationship between the curvature and the form points in the compartment including the current position.

Furthermore, each of the functions realized by the execution of the program by the control circuits 18, 54 may be substituted by dedicated hardware for each of the functions such as an FPGA that can be programmed for a certain circuit structure.

Such changes and modifications are to be understood as being within the scope of the present invention as defined by the appended claims.

What is claimed is:

1. A new road information storage apparatus for use in a vehicle comprising:
    a road map data retrieval unit that retrieves a first set of road map data;
    a current position detector that detects a current position of the vehicle;
    a current position determiner that determines that the current position of the vehicle belongs to none of plural roads in the first set of road map data based on positional information of the plural roads;
    a data size estimator that estimates an incremental data size of a second set of road map data based on structure information of a new road when the new road that is defined as a set of vehicle positions that are determined not to be belonging to any of the plural roads in the first set of the road map data by the current position determiner is added to the second set of road map data; and
    a storage unit that stores positional information of the new road together with the incremental data size regarding the new road estimated by the data size estimator,
    wherein the data size estimator estimates the incremental data size in proportion to a length of the new road,
    a content of the first set of road map data is identical to a content of the second set of road map data,
    the data size estimator determines a relationship between a length of a specific road in the first set of road map data and a data size of the specific road in the first set of road map data, and
    a data size estimator that estimates an incremental data size of a second set of road map data based on structure information of a new road when the new road that is defined as a set of vehicle positions that are determined not to be belonging to any of the plural roads in the first set of the road map data by the current position determiner is added to the second set of road map data; and
    a storage unit that stores positional information of the new road together with the incremental data size regarding the new road estimated by the data size estimator,
    wherein the data size estimator estimates the incremental data size regarding the new road in proportion to a number of intersections included in the new road,
    a content of the first set of road map data is identical to a content of the second set of road map data,
    the data size estimator determines a relationship between the number of intersections in the first set of road map data and a data size of the intersections in the first set of road map data, and
    the data size estimator estimates the incremental data size based on the determined relationship and the number of intersections in the new road.

2. The new road information storage apparatus of claim 1, wherein the storage unit stores a passing frequency of the vehicle through the new road together with the incremental data size regarding the new road and the positional information of the new road.

3. The new road information storage apparatus of claim 1, wherein the data size estimator estimates the incremental data size regarding the new road in proportion to a number of intersections included in the new road.

4. A new road information storage apparatus for use in a vehicle comprising:
- a road map data retrieval unit that retrieves a first set of road map data;
- a current position detector that detects a current position of the vehicle;
- a current position determiner that determines that the current position of the vehicle belongs to none of plural roads in the first set of road map data based on positional information of the plural roads;
- providing a function of a current position determiner for determining that the current position of the vehicle belongs to none of plural roads in a first set of the road map data based on positional information of the plural roads;
- providing a function of a data size estimator for estimating an incremental data size of a second set of road map data based on structure information of a new road when the new road that is defined as a set of vehicle positions that are determined not to be belonging to any of the plural roads in the first set of the road map data by the current position determiner is added to the second set of road map data; and
- providing a function of a storage unit for storing positional information of the new road together with the incremental data size regarding the new road estimated by the data size estimator,
- wherein the data size estimator estimates the incremental data size in proportion to a length of the new road,
- a content of the first set of road map data is identical to a content of the second set of road map data,
- the data size estimator determines a relationship between a length of a specific road in the first set of road map data and a data size of the specific road in the first set of road map data, and
- the data size estimator estimates the incremental data size based on the determined relationship and the length of the new road.

5. A program product recorded in a storage medium for operating a computer to be serving as a new road information storage apparatus in a vehicle, the program product comprising steps of
- providing a function of a current position detector for detecting a current position of the vehicle;
- the data size estimator estimates the incremental data size based on the determined relationship and the length of the new road.

6. A system for storing new road information comprising:
- a new road information storage apparatus for use in a vehicle, and
- a server that receives data transmitted from the new road information storage apparatus,
- wherein the new road information storage apparatus comprising:
  - a road map data retrieval unit that retrieves a first set of road map data;
  - a current position detector that detects a current position of the vehicle;
  - a current position determiner that determines that the current position of the vehicle belongs to none of plural roads in the first set of road map data based on positional information of the plural roads;
  - a data size estimator that estimates an incremental data size of a second set of road map data based on structure information of each of new roads when each of the new roads that are respectively defined as a set of vehicle positions that are determined not to be belonging to any of the plural roads in the first set of the road map data by the current position determiner is added to the second set of road map data;
  - a storage unit that stores, for each of the new roads estimated by the data size estimator, the incremental data size, positional information of the new road as well as a travel frequency by the vehicle through the new road; and
  - a transmission unit that transmits the data stored by the storage unit to the server, and
- the server adds the data for each of the new roads to the second set of road map data in a manner that prioritizes a most frequented new road by the vehicle so as to be provided for a user in a storage medium based on the data transmitted by the transmission unit,
- wherein each of the new roads are arranged in the second set of road map data by the travel frequency in descending order, from the most frequented new road which is the new road with the highest travel frequency down to a least frequented new road.

7. A new road information appending apparatus comprising:
- a receiver that receives data from a transmitter in a vehicle, wherein the data includes an incremental data size for an addition of one of plural new roads to road map data, positional information of the one of plural new roads, and a travel frequency of the vehicle through the one of plural new roads; and
- an append unit that prioritizes appending of the data of the new road that is most frequented by the vehicle based on the data received by the receiver and vacancy information of a storage medium so that the data of each of the new roads is stored in a vacancy of the storage medium for distribution to users,
- wherein each of the new roads are arranged in the storage medium by the travel frequency of the vehicle in descending order, from the most frequented which is the new road with the highest travel frequency down to a least frequented new road.

* * * * *